United States Patent
Fan et al.

(10) Patent No.: US 9,898,206 B2
(45) Date of Patent: Feb. 20, 2018

(54) MEMORY ACCESS PROCESSING METHOD, APPARATUS, AND SYSTEM

(71) Applicant: Huawei Technologies Co., Ltd., Shenzhen (CN)

(72) Inventors: Dongrui Fan, Beijing (CN); Fenglong Song, Beijing (CN); Da Wang, Beijing (CN); Xiaochun Ye, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 85 days.

(21) Appl. No.: 15/017,081

(22) Filed: Feb. 5, 2016

(65) Prior Publication Data
US 2016/0154590 A1    Jun. 2, 2016

Related U.S. Application Data

(63) Continuation of application No. PCT/CN2014/083322, filed on Jul. 30, 2014.

(30) Foreign Application Priority Data

Aug. 6, 2013  (CN) .......................... 2013 1 0339295

(51) Int. Cl.
*G06F 3/06* (2006.01)
*G06F 9/38* (2018.01)

(52) U.S. Cl.
CPC .......... *G06F 3/0611* (2013.01); *G06F 3/0656* (2013.01); *G06F 3/0683* (2013.01); *G06F 9/3824* (2013.01)

(58) Field of Classification Search
CPC .... G06F 3/0611; G06F 3/0656; G06F 3/0683; G06F 9/3824
See application file for complete search history.

(56) References Cited

U.S. PATENT DOCUMENTS

| 6,266,744 B1 * | 7/2001 | Hughes ................. G06F 9/3834 711/123 |
| 6,735,679 B1 * | 5/2004 | Herbst .................... H04L 47/50 711/167 |

(Continued)

FOREIGN PATENT DOCUMENTS

| CN | 101206624 A | 6/2008 |
| CN | 102171649 A | 8/2011 |

(Continued)

OTHER PUBLICATIONS

Partial English Translation and Abstract of Chinese Patent Application No. CN101206624, Feb. 25, 2016, 4 pages.

(Continued)

*Primary Examiner* — Hashem Farrokh
(74) *Attorney, Agent, or Firm* — Conley Rose, P.C.

(57) ABSTRACT

A memory access processing method and apparatus, and a system. The method includes receiving a memory access request sent by a processor, combining multiple memory access requests received within a preset time period to form a new memory access request, where the new memory access request includes a code bit vector corresponding to memory addresses. A first code bit identifier is configured for the code bits that are in the code bit vector and corresponding to the memory addresses accessed by the multiple memory access requests. The method further includes sending the new memory access request to a memory controller, so that the memory controller executes a memory access operation on a memory address corresponding to the first code bit identifier. The method effectively improves memory bandwidth utilization.

14 Claims, 9 Drawing Sheets

(56) References Cited

U.S. PATENT DOCUMENTS

| | | | |
|---|---|---|---|
| 2006/0168416 A1 | 7/2006 | Kessels et al. | |
| 2009/0019225 A1 | 1/2009 | Maeda | |
| 2009/0240895 A1* | 9/2009 | Nyland | G06F 9/3824 711/149 |
| 2010/0077177 A1* | 3/2010 | Luick | G06F 9/30036 712/28 |
| 2010/0161936 A1* | 6/2010 | Royer | G06F 3/061 711/209 |
| 2013/0305020 A1* | 11/2013 | Valentine | G06F 9/3001 712/208 |

FOREIGN PATENT DOCUMENTS

| | | |
|---|---|---|
| CN | 102541769 A | 7/2012 |
| JP | 20100134628 A | 6/2010 |
| KR | 19930014114 A | 7/1993 |
| KR | 20020055528 A | 7/2002 |
| KR | 20060017876 A | 2/2006 |
| WO | 2012134532 A1 | 10/2012 |

OTHER PUBLICATIONS

Foreign Communication From a Counterpart Application, PCT Application No. PCT/CN2014/083322, English Translation of International Search Report dated Nov. 4, 2014, 2 pages.

Foreign Communication From a Counterpart Application, PCT Application No. PCT/CN2014/083322, English Translation of Written Opinion dated Nov. 4, 2014, 16 pages.

Foreign Communication From a Counterpart Application, European Application No. 14833788.4, Extended European Search Report dated Nov. 7, 2016, 8 pages.

Machine Translation and Abstract of Korean Publication No. KR20020055528, Jul. 9, 2002, 19 pages.

Foreign Communication From a Counterpart Application, Canadian Application No. 2920528, Canadian Office Action dated Nov. 1, 2017, 4 pages.

Foreign Communication From a Counterpart Application, Korean Application No. 10-2016-7005663, Korean Notice of Allowance and Brief Translation dated Dec. 28, 2017, 3 pages.

* cited by examiner

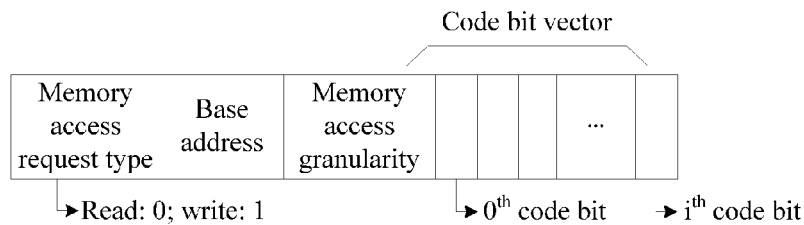

FIG. 3

Receive a new memory access request, where the new memory access request is formed by combining multiple memory access requests received within a preset time period, and the new memory access request includes a code bit vector consisting of code bits corresponding to memory addresses, a base address of the memory addresses accessed by the memory access requests that are combined, a memory access granularity, and a memory access request type; and a first code bit identifier indicating there is a memory access operation is configured for the code bits that are in the code bit vector and corresponding to the memory addresses accessed by the memory access requests that are combined    301

Obtain, by parsing the new memory access request, the memory addresses accessed by the memory access requests that are combined, and execute a memory access operation on the memory addresses that are obtained by the parsing    302

FIG. 4

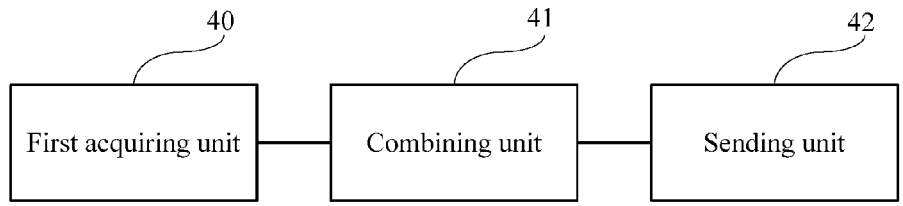

FIG. 5

MEMORY ACCESS PROCESSING METHOD, APPARATUS, AND SYSTEM

CROSS-REFERENCE TO RELATED APPLICATION

This application is a continuation of International Application No. PCT/CN2014/083322, filed on Jul. 30, 2014, which claims priority to Chinese Patent Application No. 201310339295.0, filed on Aug. 6, 2013, both of which are hereby incorporated by reference in their entireties.

TECHNICAL FIELD

The present disclosure relates to computer technologies, and in particular, to a memory access processing method and apparatus, and a system.

BACKGROUND

During a running process of a computer processor, a speed for acquiring data from an off-chip memory by the processor directly affects efficiency of the processor.

A read/write speed of an off-chip memory is much lower than a data processing speed of a processor. Therefore, in order to reduce latency for a processor to read data, a caching technique cache is used in the prior art by taking advantage of temporal locality and spatial locality of a program, that is, a cache is disposed on a processor chip to cache data commonly used by the processor. A data read/write speed of the cache is relatively high. When reading data, the processor accesses the cache first. When the accessed data is not in the cache, the processor accesses an off-chip memory using a memory controller. With the cache, work efficiency of the processor can be effectively improved. To facilitate data management, data in a cache is managed with a granularity of a cache line, such as 64 bytes. When data is read or written between the cache and an off-chip memory, data is also read into an on-chip cache together with a granularity of a cache line.

However, when the foregoing processor reads or writes data, for an application program with poor data locality, the processor needs to repeatedly access the off-chip memory using the memory controller, which wastes relatively large access bandwidth. In addition, when a multi-core processor concurrently sends a large quantity of memory access operations to the memory controller, because a quantity of memory access requests that can be received and processed concurrently by the memory controller is limited, some memory access requests are congested in the memory controller and cannot be processed in a timely and efficient manner.

SUMMARY

Embodiments of the present disclosure provide a memory access processing method and apparatus, and a system, which can improve timeliness of processing a memory access request, and can improve effective bandwidth utilization of a memory controller.

A first aspect of an embodiment of the present disclosure provides a memory access processing method, including receiving a memory access request sent by a processor, combining multiple memory access requests received within a preset time period to form a new memory access request, where the new memory access request includes a base address of the memory addresses accessed by the memory access requests that are combined, a memory access granularity, and a memory access request type, and a code bit vector consisting of code bits corresponding to the memory addresses, and a first code bit identifier indicating there is a memory access operation is configured for the code bits that are in the code bit vector and corresponding to the memory addresses accessed by the memory access requests that are combined, and sending the new memory access request to a memory controller, so that the memory controller executes, according to the new memory access request, a memory access operation on a memory address corresponding to the first code bit identifier.

With reference to the memory access processing method of the first aspect, in a first implementation manner, the combining multiple memory access requests received within a preset time period to form a new memory access request, where the new memory access request includes a base address of the memory addresses accessed by the memory access requests that are combined, a memory access granularity, and a memory access request type, and a code bit vector consisting of code bits corresponding to the memory addresses, includes collecting, to a same row of an address index table, the multiple memory access requests that are received within the preset time period and that have a same memory access request type, a same base address of the memory addresses corresponding to the memory access requests, and a same memory access granularity, where each row of the address index table includes a memory access request type, a base address of memory addresses accessed by memory access requests, a memory access granularity, and a code bit vector, where memory addresses corresponding to all code bits that form a code bit vector in each row have a same base address, and extracting the memory access request type, the base address, the memory access granularity, and a code bit vector of the collected memory access requests from the same row of the address index table to form the new memory access request.

With reference to the first implementation manner of the memory access processing method of the first aspect, in a second implementation manner, if the memory access request type of the new memory access request is a read memory operation, after the sending the new memory access request to a memory controller, the method further includes writing data, which is returned after the memory controller executes the read memory operation according to the new memory access request, to a cache integrated in the processor, and updating the first code bit identifier, which is in the code bit vector of the address index table and is corresponding to the executed memory access operation, to a second code bit identifier that indicates there is no memory access operation.

With reference to the first implementation manner or the second implementation manner of the memory access processing method of the first aspect, in a third implementation manner, if the memory access request type of the new memory access request is a write memory operation, after the sending the new memory access request to a memory controller, the method further includes sending data, which is corresponding to the write memory operation and is read from a cache of the processor, to the memory controller, so that the memory controller writes the data corresponding to the write memory operation to a memory address corresponding to the new memory access request, and updating the first code bit identifier, which is in the code bit vector of the address index table and is corresponding to the executed memory access operation, to a second code bit identifier that indicates there is no memory access operation.

With reference to the first implementation manner, the second implementation manner or the third implementation manner of the memory access processing method of the first aspect, in a fourth implementation manner, if a quantity of bits of each memory address is A, a quantity of bits of the code bit vector of the address index table is N, and the memory access granularity is L, the base address of the collected memory access requests whose memory access granularity is L in the row of the address index table has $(A-\log_2(N*L))$ bits.

A second aspect of an embodiment of the present disclosure provides a memory access processing method, including receiving a new memory access request, where the new memory access request is formed by combining multiple memory access requests received within a preset time period, and the new memory access request includes a base address of the memory addresses accessed by the memory access requests that are combined, a memory access granularity, and a memory access request type, and a code bit vector consisting of code bits corresponding to the memory addresses, and a first code bit identifier indicating there is a memory access operation is configured for the code bits that are in the code bit vector and corresponding to the memory addresses accessed by the memory access requests that are combined, and obtaining, by parsing the new memory access request, the memory addresses accessed by the memory access requests that are combined, and executing a memory access operation on the memory addresses that are obtained by the parsing.

With reference to the memory access processing method of the second aspect, in a first implementation manner, the new memory access request is formed by combining the multiple memory access requests that are received within the preset time period and that have a same memory access request type, a same base address of the memory addresses corresponding to the memory access requests, and a same memory access granularity, and the obtaining, by parsing the new memory access request, the memory addresses accessed by the memory access requests that are combined includes acquiring the base address and the memory access granularity of the memory access requests that are combined in the new memory access request, and position information of each first code bit identifier in the code bit vector of the new memory access request, and if the acquired position information indicates that the first code bit identifier is in the $i^{th}$ bit of the code bit vector, obtaining, by adding an offset address to the base address of the new memory access request, the memory addresses accessed by the memory access requests that are combined, where the offset address is a product of the acquired memory access granularity and i, and if a quantity of bits of the code bit vector of the new memory access request is N, a value of i ranges from 0 to N−1.

With reference to the first implementation manner of the memory access processing method of the second aspect, in a second implementation manner, if the memory access request type of the new memory access request is a read memory operation, executing a memory access operation on the corresponding memory addresses that are in an off-chip memory and are obtained by the parsing includes reading data in the accessed memory addresses that are obtained by the parsing, and returning the read data.

With reference to the first implementation manner of the memory access processing method of the second aspect, in a third implementation manner, if the memory access request type of the new memory access request is a write memory operation, executing a memory access operation on the corresponding memory addresses that are in an off-chip memory and are obtained by the parsing includes acquiring data corresponding to the write memory operation, and writing the data corresponding to the write memory operation to the accessed memory addresses that are obtained by the parsing.

A third aspect of an embodiment of the present disclosure provides a memory access processing apparatus, including a first acquiring unit configured to receive a memory access request sent by a processor, a combining unit configured to combine multiple memory access requests received within a preset time period to form a new memory access request, where the new memory access request includes a code bit vector consisting of code bits corresponding to memory addresses, a base address of the memory addresses accessed by the memory access requests that are combined, a memory access granularity, and a memory access request type, and a first code bit identifier indicating there is a memory access operation is configured for the code bits that are in the code bit vector and corresponding to the memory addresses accessed by the memory access requests that are combined, and a sending unit configured to send the new memory access request to a memory controller, so that the memory controller executes, according to the new memory access request, a memory access operation on a memory address corresponding to the first code bit identifier.

With reference to the memory access processing apparatus of the third aspect, in a first implementation manner, the combining unit is configured to collect, to a same row of an address index table, the multiple memory access requests that are received within the preset time period and that have a same memory access request type, a same base address of the memory addresses accessed by the memory access requests, and a same memory access granularity, where each row of the address index table includes a memory access request type, a base address of memory addresses corresponding to memory access requests, a memory access granularity, and a code bit vector, where memory addresses corresponding to all code bits that form a code bit vector in each row have a same base address, and extract the memory access request type, the base address, the memory access granularity, and the code bit vector of the collected memory access requests from the same row of the address index table to form the new memory access request.

With reference to the first implementation manner of the memory access processing apparatus of the third aspect, in a second implementation manner, if the memory access request type of the new memory access request is a read memory operation, the apparatus further includes a data writing unit configured to write data, which is returned after the memory controller executes the read memory operation according to the new memory access request, to a cache integrated in the processor, and a first updating unit configured to update the first code bit identifier, which is in the code bit vector of the address index table and is corresponding to the executed memory access operation, to a second code bit identifier that indicates there is no memory access operation.

With reference to the first implementation manner or the second implementation manner of the memory access processing apparatus of the third aspect, in a third implementation manner, if the memory access request type of the new memory access request is a write memory operation, the apparatus further includes a data reading unit configured to send data, which is corresponding to the write memory operation and is read from a cache of the processor, to the memory controller, so that the memory controller writes the data corresponding to the write memory operation to a memory address corresponding to the new memory access request, and a second updating unit configured to update the first code bit identifier, which is in the code bit vector of the address index table and is corresponding to the executed memory access operation, to a second code bit identifier that indicates there is no memory access operation.

With reference to the first implementation manner, the second implementation manner or the third implementation manner of the memory access processing apparatus of the third aspect, in a fourth implementation manner, if a quantity of bits of each memory address is A, a quantity of bits of the code bit vector of the address index table is N, and the memory access granularity is L, the base address of the collected memory access requests whose memory access granularity is L in the row of the address index table has $(A-\log_2(N*L))$ bits.

A fourth aspect of an embodiment of the present disclosure provides a memory controller, including a second acquiring unit configured to receive a new memory access request, where the new memory access request is formed by combining multiple memory access requests received within a preset time period, and the new memory access request includes a code bit vector consisting of code bits corresponding to memory addresses, and a base address of the memory addresses accessed by the memory access requests that are combined, a memory access granularity, and a memory access request type, and a first code bit identifier indicating there is a memory access operation is configured for the code bits that are in the code bit vector and corresponding to the memory addresses accessed by the memory access requests that are combined, and a memory access unit configured to obtain, by parsing the new memory access request, the memory addresses accessed by the memory access requests that are combined, and execute a memory access operation on the memory addresses that are obtained by the parsing.

With reference to the memory controller of the fourth aspect, in a first implementation manner, if the new memory access request is formed by combining the multiple memory access requests that are received within the preset time period and that have a same memory access request type, a same base address of the memory addresses corresponding to the memory access requests, and a same memory access granularity, the memory access unit is configured to acquire the base address and the memory access granularity of the memory access requests that are combined in the new memory access request, and position information of each first code bit identifier in the code bit vector of the new memory access request, if the acquired position information indicates that the first code bit identifier is in the $i^{th}$ bit of the code bit vector, obtain, by adding an offset address to the base address of the new memory access request, the memory addresses accessed by the memory access requests that are combined, where the offset address is a product of the acquired memory access granularity and i, and if a quantity of bits of the code bit vector of the new memory access request is N, a value of i ranges from 0 to N−1, and execute a memory access operation on the obtained memory addresses accessed by the memory access requests that are combined.

With reference to the memory controller of the fourth aspect or the first implementation manner of the memory controller, in a second implementation manner, if the memory access request type of the new memory access request is a read memory operation, the memory access unit is configured to read data in the accessed memory addresses that are obtained by the parsing, and return the read data.

With reference to the memory controller of the fourth aspect or the first implementation manner of the memory controller, in a third implementation manner, if the memory access request type of the new memory access request is a write memory operation, the memory access unit is configured to acquire data corresponding to the write memory operation, and write the data corresponding to the write memory operation to the accessed memory addresses that are obtained by the parsing.

A fifth aspect of an embodiment of the present disclosure provides a memory access system, including at least one processor and an off-chip memory, where the system further includes a memory access processing apparatus and a memory controller, where the memory access processing apparatus is configured to combine multiple memory access requests that are sent by the processor and received within a preset time period, to form a new memory access request, where the new memory access request includes a base address of the memory addresses accessed by the memory access requests that are combined, a memory access granularity, and a memory access request type, and a code bit vector consisting of code bits corresponding to the memory addresses, and a first code bit identifier indicating there is a memory access operation is configured for the code bits that are in the code bit vector and corresponding to the memory addresses accessed by the memory access requests that are combined, and send the new memory access request to the memory controller. The memory controller is configured to receive the new memory access request, and obtain, by parsing the new memory access request, the memory addresses accessed by the memory access requests that are combined, and execute a memory access operation on the memory addresses that are obtained by the parsing.

In the embodiments of the present disclosure, multiple memory access requests received within a preset time period are combined into a new memory access request, so that multiple memory access requests with relatively low bandwidth utilization are combined into a corresponding new memory access request with high bandwidth utilization during a memory access process, so as to execute an access operation on a memory controller in a unified manner, which reduces a quantity of memory access requests that are sent to the memory controller, helps to improve bandwidth utilization of a memory, and further ensures that the memory controller performs timely processing on a memory access request sent by a processor. When the multiple memory access requests are combined to obtain the new memory access request, a first code bit identifier is configured for a memory address accessed by each memory access request that is combined, so that when the memory controller performs memory access according to the new memory access request, the memory controller can accurately execute a memory access operation on a corresponding memory address according to the first code bit identifier, thereby implementing effective data exchange between the processor and an off-chip memory. As a result, in the embodiments of the present disclosure, timeliness of processing a memory access request sent by the processor is improved, and bandwidth utilization is effectively improved when the memory controller is accessed only once.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description show some embodiments of the present disclosure, and a person of ordinary skill in the art may still derive other drawings from these accompanying drawings without creative efforts.

FIG. 3 is a schematic structural diagram of an address index table according to an embodiment of the present disclosure.

FIG. 4 is a flowchart of Embodiment 3 of a memory access processing method according to the present disclosure.

FIG. 5 is a schematic structural diagram of Embodiment 1 of a memory access processing apparatus according to the present disclosure.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure shall fall within the protection scope of the present disclosure.

Figure 1:
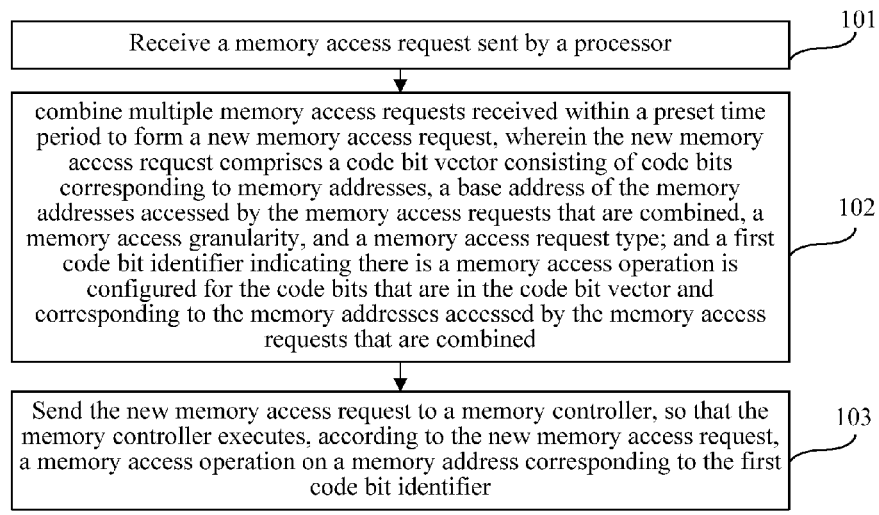
FIG. 1 is a flowchart of Embodiment 1 of a memory access processing method according to the present disclosure.

FIG. 1 is a flowchart of Embodiment 1 of a memory access processing method according to the present disclosure. As shown in FIG. 1, the method in this embodiment is executed by a memory access processing apparatus disposed between a processor and a memory controller, and the method in this embodiment includes the following steps.

Step 101: Receive a memory access request sent by the processor.

During a running process of a computer processor, such as a central processing unit (CPU), when data exchange is performed between the computer processor and an off-chip memory, the computer processor sends a memory access request to the memory controller disposed between the processor and the off-chip memory. The memory controller reads data into an on-chip cache from the off-chip memory according to a read instruction, or writes data in the on-chip cache to the off-chip memory according to a write instruction. Herein, memory access refers to an operation of reading data from, or writing data to, a memory address in the off-chip memory by the processor. Therefore, a type of a memory access request sent by the processor may be a read memory access request or a write memory access request. Because data of read requests or write requests sent by the processor has different granularities and the read requests or the write requests of the data with different granularities occur randomly, if a data granularity of a read request or a write request meets a size of a cache line in the on-chip cache, the memory access request needs to be executed only once, and the processor can directly exchange data of the memory access request with the on-chip cache. If a data granularity of a read request or a write request is less than a size of a cache line, because the data granularity of the memory access operation does not meet the size of the cache line in the on-chip cache, each time the processor sends a memory access request, the processor needs to use the memory controller to exchange data of the memory access request with the off-chip memory. In this case, the memory controller frequently executes memory access operations. As a result, it may not be conducive to improvement on effective bandwidth utilization of the memory controller, and some memory access requests are congested in the memory controller and cannot be processed in a timely manner. In this embodiment of the present disclosure, the memory access processing apparatus disposed between the processor and the memory controller can acquire a memory access request sent by the processor, and can perform, in the following processing manner, combination processing on memory access requests with different granularities sent by the processor so as to improve bandwidth utilization of the memory controller and relieve a problem that memory access requests are congested in the memory controller.

Step 102: Combine multiple memory access requests received within a preset time period to form a new memory access request. The new memory access request includes a code bit vector consisting of code bits corresponding to memory addresses, a base address of the memory addresses accessed by the memory access requests that are combined, a memory access granularity, and a memory access request type. A first code bit identifier indicating there is a memory access operation is configured for the code bits that are in the code bit vector and corresponding to the memory addresses accessed by the memory access requests that are combined.

Currently, the memory controller separately communicates with the processor and the off-chip memory using a limited quantity of pins. Therefore, a quantity of memory access requests simultaneously received and processed by the memory controller may be limited. However, each time a memory access request whose data granularity does not meet the size of the cache line in the on-chip cache is received, the memory controller executes a memory access operation on the off-chip memory. Therefore, on the premise that the memory has a limited quantity of pins, when the processor sends a large quantity of memory access requests with relatively small granularities or when a multi-core processor concurrently sends a large quantity of memory access requests to the memory controller, memory access operation for each of the memory access requests occupies some memory access bandwidth, so that some memory access requests are congested in the memory controller and fail to be processed in a timely manner. In this embodiment of the present disclosure, in order to ensure that a memory access request sent by the processor can be received and processed by the memory controller in a timely manner, the memory access processing apparatus disposed between the processor and the memory controller combines multiple memory access requests received within a period of time, that is, the preset time period, to form a new memory access request. The new memory access request includes a base address of the memory addresses accessed by the memory access requests that are combined, a memory access granularity, and a memory access request type, and a code bit vector consisting of code bits corresponding to the memory addresses. Memory addresses mapped to corresponding code bits in the code bit vector include the memory addresses accessed by the memory access requests that are combined, may include a memory address that is not accessed. The first code bit identifier indicating that there is a memory access operation is configured for the code bits that are in the code bit vector and that are corresponding to the memory addresses accessed by the memory access requests that are combined. That is, the memory access processing apparatus can combine the multiple memory access requests, which need to be sent to the memory controller in many times, to form a memory access request with a relatively large granularity, and send the formed memory access request to the memory controller once, which implements fast processing on the multiple memory access requests sent by the processor and can relieve a problem of a restriction by a pin quantity of the memory controller. In this way, access operations of the multiple memory access requests on the memory controller can be completed by executing an access operation on the memory controller only once, thereby improving bandwidth utilization of the memory controller, ensuring that memory access requests sent by the processor can be processed in a timely manner, and enhancing processor performance.

The memory access request type of the new memory access request may be a read memory operation or a write memory operation. A base address (Base_Addr) is the first address of a block of memory space, and all addresses in the block of the memory space can be obtained by adding the base address and an intra-block offset address. The memory access granularity is a volume of data that is accessed by a memory access request sent by the processor, and the memory access request may be a memory access request with different granularities, such as 8 bytes or 16 bytes.

In this embodiment of the present disclosure, to ensure that the formed new memory access request corresponds to the combined multiple memory access requests and that the new memory access request, when being processed, can accurately access data of the memory addresses corresponding to the combined multiple memory access requests, when the new memory access request is obtained by means of combination, a corresponding first code bit identifier indicating that there is a memory access operation is configured for a memory address accessed by each combined memory access request. Therefore, when the memory controller performs memory access according to the new memory access request, the memory controller can determine, according to the first code bit identifier carried in the code bit vector of the new memory access request, that there is a memory access operation in a corresponding memory address, and execute a memory access operation on the corresponding memory address.

In this embodiment of the present disclosure, a corresponding first code bit identifier is configured in the code bit vector of the new memory access request for the memory addresses accessed by the memory access requests that are combined, so that the memory controller can correctly obtain, by means of parsing, multiple memory addresses to be accessed by the processor. These memory addresses may be non-contiguous, and the range of memory addresses of the memory access requests that are combined are not limited by the size of the cache line in the on-chip cache. Therefore, the method in this embodiment of the present disclosure can further support irregular and leaping memory access, which improves flexibility of configuring a memory address. In an existing cache, data writing, replacement and removal are all performed in unit of a cache line. If the cache line is set improperly, a memory access request with a relatively small granularity cannot be processed in a timely manner. Compared with the existing cache, in this embodiment of the present disclosure, a memory access granularity of a memory access request sent by the processor is not limited. In an exemplary application, the memory access processing apparatus may classify and combine multiple memory access requests by a same granularity, or a same request type, or a same range of memory access addresses, to form a memory access request with a relatively large granularity, and send, in a unified manner, the formed memory access request to the memory controller for executing a memory access operation. In addition, code bit identifiers configured for the code bit vector of the new memory access request are mapped to the memory addresses of the combined multiple memory access requests, so that during a memory access process, a processing situation of the memory access requests that are combined can be determined according to the code bit identifiers, which ensures correct execution of the memory access requests sent by the processor. In an actual operation, multiple memory access requests with relatively small granularities can be combined into a memory access request with a relatively large granularity, so that memory access operations of multiple memory access requests on the memory controller can be implemented by accessing the memory controller only once, which improves memory bandwidth utilization, ensures that the memory controller can process, in a timely manner, a memory access request sent by the processor, and further improves flexibility of configuring a memory address in the memory access request.

Step 103: Send the new memory access request to the memory controller, so that the memory controller executes, according to the new memory access request, a memory access operation on a memory address corresponding to the first code bit identifier.

After combining the multiple memory access requests to form the new memory access request, the memory access processing apparatus can send the new memory access request as one memory access request to the memory controller, which prevents a problem that memory bandwidth utilization is relatively low because the memory controller is accessed separately the multiple memory access requests and this leads to a decrease in the throughput rate of processing the memory access requests by the memory controller.

In this embodiment of the present disclosure, memory access requests, sent by the processor, with a relatively small memory access granularity can be combined into a memory access request with a relatively large granularity, and memory access requests with a relatively large memory access granularity can also be combined. Memory access requests with a relatively large granularity can be combined into a memory access request with a larger granularity using the method in this embodiment of the present disclosure. Likewise, multiple access operations on the memory controller by the multiple memory access requests sent by the processor can be implemented by accessing the memory controller only once.

In this embodiment of the present disclosure, multiple memory access requests received within a preset time period are combined into a new memory access request, so that multiple memory access requests with relatively low bandwidth utilization are combined into a corresponding new memory access request with high bandwidth utilization during a memory access process, so as to execute an access operation on a memory controller in a unified manner, which reduces a quantity of memory access requests that are sent to the memory controller, helps to improve memory bandwidth utilization, and further ensures that the memory controller performs timely processing on a memory access request sent by a processor. When the multiple memory access requests are combined to obtain the new memory access request, a corresponding first code bit identifier is configured for a memory address accessed by each combined memory access request, so that the memory controller can accurately execute a memory access operation on a corresponding memory address according to the first code bit identifier when performing memory access according to the new memory access request, thereby implementing effective data exchange between the processor and an off-chip memory. Therefore, in this embodiment of the present disclosure, timeliness of processing a memory access request sent by the processor is improved, and bandwidth utilization is further effectively improved when the memory controller is accessed only once.

Figure 2:
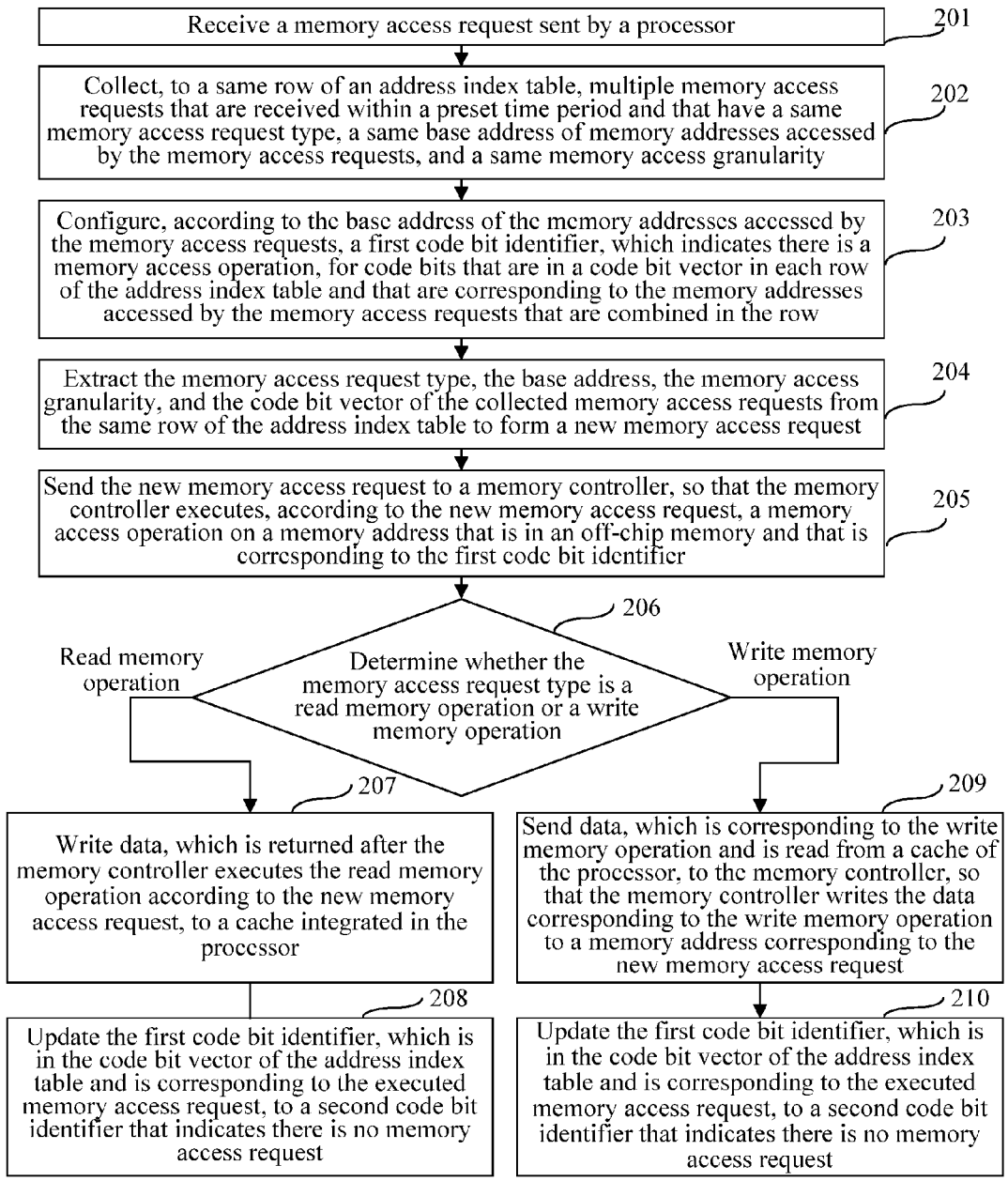
FIG. 2 is a flowchart of Embodiment 2 of a memory access processing method according to the present disclosure.

FIG. 2 is a flowchart of Embodiment 2 of a memory access processing method according to the present disclosure. As shown in FIG. 2, the method in this embodiment includes the following steps.

Step 201: Receive a memory access request sent by a processor.

Step 202: Collect, to a same row of an address index table, multiple memory access requests that are received within a preset time period and that have a same memory access request type, a same base address of memory addresses accessed by the memory access requests, and a same memory access granularity.

Step 203: Configure, according to the base address of the memory addresses accessed by the memory access requests, a first code bit identifier, which indicates there is a memory access operation, for code bits that are in a code bit vector in each row of the address index table and that are corresponding to the memory addresses accessed by the memory access requests that are combined in the row.

In this embodiment of the present disclosure, to enable a memory controller to fast parse and process a memory address to be accessed by a memory access request collected by a memory access processing apparatus and to simplify a structure of the memory access processing apparatus, the multiple memory access requests that are received within the preset time period, for example, 20 milliseconds (ms), and that have the same memory access request type, the same base address of the memory addresses corresponding to the memory access requests, and the same memory access granularity, are collected to the same row of the address index table. The first code bit identifier indicating that there is a memory access operation is configured for the code bits that are in the code bit vector in the row of the address index table and that are corresponding to the memory addresses accessed by the memory access requests that are combined.

In this embodiment, after the memory access request sent by the processor is acquired, the multiple memory access requests that have the same memory access request type, the same base address, and the same memory access granularity are collected to the same row of the address index table. The memory access processing apparatus may combine the multiple memory access requests collected in the same row of the address index table to form a new memory access request, where the new memory access request corresponds to one time of access to the memory controller. After the memory controller receives the new memory access request, the memory controller executes a memory access operation for each of the memory access requests that are combined, according to each first code bit identifier configured in the new memory access request. Memory access requests concurrently sent by the processor, especially a multi-core processor, may have different granularities, may include both a read memory access request and a write memory access request, and may further be used by the processor to access data in different base address areas. Therefore, after combination processing is performed on a large quantity of memory access requests according to a same memory access granularity, a same memory access request type, and a same base address, multiple new memory access requests are formed, where each new memory access request is corresponding to one access operation on the memory controller. When the memory access processing apparatus sends a new memory access request corresponding to a row to the memory controller, the memory controller can execute a memory access operation corresponding to the memory access requests that are combined in the row. An address index table consisting of one row is used as an example for description in the following.

FIG. 3 is a schematic structural diagram of an address index table according to an embodiment of the present disclosure. As shown in FIG. 3, a memory access request type in the address index table may be a read memory operation or a write memory operation, which are represented by 0 and 1 respectively. The memory access request type indicates that memory access request types of the memory access requests that are combined are all read memory operations or all write memory operations, a base address is the base address of memory addresses accessed by the memory access requests that are combined, a memory access granularity indicates a volume of data accessed by the memory access requests that are combined, and each code bit in a code bit vector is corresponding to a memory address of memory space, where the memory addresses accessed by the memory access requests that are combined can be encoded by encoding the code bits in the code bit vector.

In actual application, if a memory access request is received within a preset time period, and the memory access request indicates access to a memory address, a code bit that is in the code bit vector and that is corresponding to the memory address is marked as 1, which indicates that, in a new memory access request formed by combining the memory access requests received within the preset time period, the memory address corresponding to the code bit is to be accessed during a memory access operation corresponding to the new memory access request. If no memory access request that indicates access to a memory address is received within a preset time period, a code bit that is in the code bit vector and that is corresponding to the memory address is marked as 0, which indicates that, in a new memory access request formed by combining the memory access requests received within the preset time period, the memory address corresponding to the code bit is not to be accessed during a memory access operation corresponding to the new memory access request. Therefore, after the new memory access request is formed by the combination, the memory controller can determine, by determining whether a value of the code bit in the code bit vector is 1 or 0, whether the memory address corresponding to the code bit is accessed or not during the memory access operation. Therefore, the code bit vector in the address index table is corresponding to a block of an address space that starts from a base address, each code bit in the code bit vector is mapped to an address range whose volume of data is a memory access granularity in a memory, and the code bit identifier indicates whether the data within the address range is accessed when the memory controller executes the memory access operation. In this embodiment of the present disclosure, the first code bit identifier indicates that there is a memory access operation in the memory address mapped to the code bit, and a second code bit identifier indicates that there is no memory access operation in the memory address mapped to the code bit.

When the combined multiple memory access requests have the same memory access request type, the same base address of the memory addresses corresponding to the memory access requests, and the same memory access granularity, a memory address mapped to the $i^{th}$ bit of the code bit vector is a memory address that is obtained by adding an offset "granularity*i" to the base address of the address index table, for example, "base address+ granularity*i". In this way, when the memory controller receives the new memory access request, the memory addresses accessed by the memory access requests that are combined and that are sent by the processor can be computed conveniently. That is, when the memory access processing apparatus uses the foregoing method to perform encoding, the memory controller can determine, according to a correspondence between the code bits and the memory addresses, the memory addresses of data to be accessed by the memory access requests sent by the processor, so that a memory access operation is accurately executed.

In this embodiment of the present disclosure, if a quantity of bits of a memory address in a computer system is A, a quantity of bits of the code bit vector of the address index table is N, and the memory access granularity is L, the base address of the collected memory access requests whose memory access granularity is L in the row of the address index table has $(A-\log_2(N*L))$ bits. Therefore, after the quantity of bits of the memory address in the system is determined, a quantity of bits of the base address can be computed according to the quantity of bits of the code bit vector and the memory access granularity, and the first address of a memory address segment can be further determined. When the memory access requests are received, the base address of the memory addresses can be determined according to the memory addresses accessed by the memory access requests. The following example uses a system with a 32-bit memory address and memory access for reading data with an 8 bytes memory access granularity as an example for description, where memory access with a granularity of (n*8) bytes may be considered as n 8 bytes memory access with a same base address. That is, a new memory access request with a (n*8)-bytes granularity executed by the memory controller may be formed by combining n 8 bytes memory access requests with a same base address. In actual application, a correspondence between a granularity value of the address index table and a memory access granularity of a memory access request may be preset, and the memory controller can determine the memory access granularity of the memory access requests that are combined according to the correspondence when receiving the new memory access request sent by the memory access processing apparatus, so as to compute the base address and a memory address of each memory access request. For example, when a granularity value of the address index table is set to 0, it indicates that multiple memory access requests with an 8 bytes granularity are combined, and a memory range mapped to any 1-bit code bit in the code bit vector of the address index table is 8 bytes. If the code bit vector has 128 bits, the memory range mapped to the code bit vector of the formed new memory access request is 1 kilobit (kb), for example, 1024 bits, therefore it can be determined that the base address in the address index table has 22 bits, and the value of the base address is the upper 22 bits in the 32-bit memory address. If a memory access granularity mapped to any 1-bit code bit in the code bit vector is 32 bytes, that is, a memory range mapped to any 1-bit code bit is 32 bytes, and the code bit vector has 128 bits, the memory range mapped to the code bit vector of the formed new memory access request is 4 kb, and it can be determined that the base address has 20 bits and a value of the base address is the upper 20 bits in the 32-bit memory address.

Step 204: Extract the memory access request type, the base address, the memory access granularity, and the code bit vector of the collected memory access requests from the same row of the address index table to form a new memory access request.

To process, in a timely manner, the memory access requests sent by the processor and to reduce memory access latency, the memory access processing apparatus in this embodiment of the present disclosure extracts, from the address index table, the memory access request type, the base address of the memory addresses, the memory access granularity and the code bit vector of the memory access requests that are collected within the preset time period, to form the new memory access request.

Step 205: Send the new memory access request to a memory controller, so that the memory controller executes, according to the new memory access request, a memory access operation on a memory address that is in an off-chip memory and that is corresponding to the first code bit identifier.

Because the memory addresses accessed by the memory access requests that are combined have the same base address and the same memory access granularity, and the memory addresses accessed by the memory access requests that are combined are addresses in a memory block, the memory controller can rapidly obtain, by parsing the new memory access request, the memory addresses accessed by the memory access requests that are combined, and execute a memory access operation. That is, the memory controller can rapidly compute the accessed memory addresses according to the base address of the new memory access request and the code bit identifier in the code bit vector. In addition, using this combination manner in this embodiment of the present disclosure, the memory access processing apparatus only needs to store, when receiving the memory access requests sent by the processor, the memory access requests sequentially according to the memory access request type, the base address of the memory addresses accessed by the memory access requests and the memory access granularity, and perform real-time encoding on the code bit in the code bit vector according to the memory addresses accessed by the memory access requests. Therefore, the memory access processing apparatus can implement this embodiment of the present disclosure only by setting a data table with a simple structure. The simple structure is conducive to implementation of the structure of the memory access processing apparatus. In actual application, multiple rows may be set for the address index table in the memory access processing apparatus, where each row is used to collect, within a preset time period, and combine memory access requests that meet different memory access granularities, memory access request types or base addresses. When a memory access request type, a base address, a memory access granularity and a code bit vector are extracted from a same row, a new memory access request corresponding to the row can be obtained.

Step 206: Determine whether the memory access request type is a read memory operation or a write memory operation. If the memory access request type is the read memory operation, execute step 207 and step 208. If the memory access request type is the write memory operation, execute step 209 and step 210.

Step 207: Write data, which is returned after the memory controller executes the read memory operation according to the new memory access request, to a cache integrated in the processor.

Step 208: Update the first code bit identifier, which is in the code bit vector of the address index table and is corresponding to the executed memory access operation, to a second code bit identifier that indicates there is no memory access operation.

After the new memory access request is sent to the memory controller, the memory controller implements a memory access operation on the off-chip memory by interacting with the off-chip memory. If the memory access request type is the read memory operation, the new memory access operation is to read data of the memory access request in the off-chip memory into an on-chip cache. During a memory access process, the memory controller returns the request data, which is returned by the off-chip memory, to the memory access processing apparatus, so that the memory access processing apparatus can write the returned data to the cache integrated in the processor, for example, cache the data in a home node of the data in the on-chip cache, so as to complete the memory access request sent by the processor. During this memory access process, the memory controller can parse the code bit vector according to the new memory access request to acquire a memory address mapped to each code bit, so as to acquire the memory addresses accessed by the memory access requests that are combined, and access the off-chip memory using the acquired memory addresses. A code bit, configured with the first code bit identifier, in the code bit vector of the new memory access request is mapped to a memory address accessed by each memory access request sent by the processor. Therefore, the memory controller may return the data of these memory access requests to the on-chip cache in any sequence in several times, and record a processed memory access request using the memory access processing apparatus to update a code bit that is in the code bit vector and that is corresponding to the memory access request whose data is returned. A situation of returning data of the read memory operation to the on-chip cache can be maintained in real time in a manner of updating a code bit. For example, when the code bit identifier of the code bit is 1, it indicates that the code bit is mapped to a memory access request for the off-chip memory. When the data of the memory access request has been written to the on-chip cache, the memory access processing apparatus update the code bit, which is corresponding to the memory access request whose data is returned, from 1 to 0. When code bit identifiers of all code bits in the code bit vector of the new memory access request are 0, it indicates that all the memory access requests that are combined into the new memory access request have been executed. Therefore, all entry content of the address index table can be deleted, so as to collect a new memory access request.

Step 209: Send data, which is corresponding to the write memory operation and is read from a cache of the processor, to the memory controller, so that the memory controller writes the data corresponding to the write memory operation to a memory address corresponding to the new memory access request.

Step 210: Update the first code bit identifier, which is in the code bit vector of the address index table and is corresponding to the executed memory access operation, to a second code bit identifier that indicates there is no memory access operation.

If the memory access request type is the write memory operation, the write memory operation is to write data of the memory access request in the on-chip cache to the off-chip memory. During a memory access process, the memory access processing apparatus extracts, according to the memory access requests and from the on-chip cache, data to be written to the off-chip memory, and the memory controller generates a memory address of the off-chip memory according to the new memory access request obtained by combination, and writes the data extracted by the memory access processing apparatus to the corresponding off-chip memory to complete the write memory operation. During the write operation, the memory access processing apparatus updates, in a timely manner, the code bit that is in the code bit vector of the address index table and that is corresponding to the memory access request for which the write memory operation has been completed, so as to record an execution situation of the write memory operation, that is, update the code bit for which the write memory operation has been completed to the second code bit identifier that indicates there is no memory access operation.

In this embodiment of the present disclosure, multiple memory access requests that are received within a preset time period and that have a same memory access request type, a same base address of memory addresses corresponding to the memory access requests, and a same memory access granularity, are collected to a same row of an address index table, and are combined to form a new memory access request, so that a memory access processing apparatus can collect and combine the memory access requests using the address index table that has a simple structure and is easy to implement. Because the memory addresses of the multiple memory access requests that are combined to form the new memory access request have the same base address, addressing for memory access needs to be performed only in a specific memory area, so that memory access efficiency is relatively high. The memory access requests collected and combined within the preset time period are sent to the memory controller in a timely manner, which enables the memory controller to process a corresponding memory access operation in a timely manner, helps to reducing memory access latency.

In actual application, a cache that can be integrated in a processor chip includes a Programmable on-chip Memory (PoM), such as Scratch-Pad Memory (SPM), or the like, and/or includes an on-chip cache. In this kind of cache, a PoM is corresponding to a segment of memory address space, and a storage location of data in the PoM can be determined using a memory address, where the storage location is a home node of the data in the cache. Therefore, whether the data accessed by the processor is in the on-chip cache can be determined using the home node. When the on-chip cache includes only the PoM, for data cached on the PoM, a location of the data in the cache can be determined according to the home node of the data. Therefore, when the processor sends a read memory access request, whether the to-be-accessed data is on the PoM can be determined according to the memory address accessed by the read memory access request sent by the processor. When the data of the read memory access request is on the PoM, the processor can directly obtain the accessed data. When the data of the read memory access request is not on the PoM, the read memory access request needs to be sent to the memory controller for accessing the off-chip memory. Therefore, when the on-chip cache includes only the PoM, the memory access processing apparatus disposed between the processor and the memory controller is used to perform combination processing on the multiple memory access requests, and the memory access processing apparatus returns and caches the data, which is obtained after the memory controller performs memory access, to each home node of the PoM. When the processor sends a write memory access request, to-be-written data is cached on the PoM according to the memory address accessed by the write memory access request, and the write memory access request is sent to the memory controller for writing the cached to-be-written data to the off-chip memory. During this write memory process, multiple write memory access requests are combined and processed by the memory access processing apparatus. After the memory controller executes the write memory operation, data stored in the off-chip memory is consistent with the data on the on-chip PoM, and processing of the write memory operation is implemented.

When the on-chip cache includes only an on-chip cache, and when a memory access request sent by the processor does not hit cache data, the memory controller may be directly accessed, and the memory controller executes a memory access operation on the off-chip memory, so as to directly write data of the memory access request to the off-chip memory or read the data to the cache from the off-chip memory. In actual application, when multiple memory access requests that do not hit cache data are concurrently sent to the memory controller, a problem of memory access congestion still occurs. In order to ensure that the memory access requests that do not hit the cache data can also be processed in a timely manner, in this embodiment of the present disclosure, a management policy of the on-chip cache is further adjusted properly. For example, an existing cache is improved, and a home node of data is set in the cache, so as to ensure that whether the data is in the cache can also be determined according to a storage location when the cache is accessed. For the cache on which the home node of the data is set, a manner of processing the data of the memory access request sent by the processor is similar to that of the foregoing PoM. Therefore, when the memory access request does not hit the cache data, the cache can send the memory access request to the memory access processing apparatus for combination processing, so as to access the memory controller in a unified manner.

When the cache has both a PoM and an on-chip cache, an address selector disposed on the processor chip can determine, according to a memory address of a memory access request, whether the memory access request is for accessing the PoM or accessing the on-chip cache. When the memory address belongs to PoM address space, the request is a PoM request. Otherwise, the request is a cache request. In this case, the address selector can filter a request for accessing the PoM. With respect to the request for accessing the PoM, the PoM can perform processing in the foregoing processing manner that is used when the on-chip cache includes only the PoM. With respect to the request for accessing the on-chip cache, the on-chip cache can perform processing in the foregoing processing manner that is used when the on-chip cache includes only the on-chip cache.

FIG. 4 is a flowchart of Embodiment 3 of a memory access processing method according to the present disclosure. As shown in FIG. 4, the method in this embodiment is executed by a memory controller, and the method in this embodiment includes the following steps.

Step 301: Receive a new memory access request, where the new memory access request is formed by combining multiple memory access requests received within a preset time period, and the new memory access request includes a code bit vector consisting of code bits corresponding to memory addresses, a base address of the memory addresses accessed by the memory access requests that are combined, a memory access granularity, and a memory access request type. A first code bit identifier indicating there is a memory access operation is configured for the code bits that are in the code bit vector and corresponding to the memory addresses accessed by the memory access requests that are combined.

Step 302: Obtain, by parsing the new memory access request, the memory addresses accessed by the memory access requests that are combined, and execute a memory access operation on the memory addresses that are obtained by the parsing.

In this embodiment, after the memory controller receives the new memory access request that is formed by combining the multiple memory access requests and sent by a memory access processing apparatus, the memory controller acquires, by parsing the new memory access request, the memory addresses accessed by the memory access requests that are combined, so as to execute a memory access operation on an off-chip memory according to the acquired memory addresses. The new memory access request, which is obtained by combining the multiple memory access requests, is sent as one memory access request in a unified manner when being sent by the memory access processing apparatus to the memory controller, thereby reducing occupation of memory bandwidth and improving utilization of the memory bandwidth. In addition, the code bits corresponding to the first code bit identifier configured by the memory access processing apparatus for the code bit vector are mapped to the memory addresses accessed by the memory access requests that are combined, so that the memory controller can obtain, by means of parsing, a memory address of the off-chip memory accessed by the memory access requests sent by a processor. Therefore, the memory access requests sent by the processor can be accurately executed.

In actual application, to simplify a structure of the memory access processing apparatus and to enable the memory controller to rapidly obtain, by means of parsing, the accessed memory address upon receipt of the new memory access request, the memory access processing apparatus in this embodiment of the present disclosure combines the multiple memory access requests that are collected within the preset time period and that have the same memory access request type, the same base address of the memory addresses corresponding to the memory access requests, and the same memory access granularity, to form the new memory access request. After the memory controller receives the new memory access request, the memory controller first obtains, by means of parsing, base address information and the memory access granularity of the new memory access request, and position information of each first code bit identifier in the code bit vector of the new memory access request, and then acquires, by means of parsing according to the first code bit identifier configured for the code bits in the code bit vector, the memory addresses accessed by the memory access requests combined by the memory access processing apparatus. An exemplary process of computing the accessed memory addresses is if the acquired first code bit identifier is in the $i^{th}$ bit of the code bit vector, obtaining, by adding an offset address to the base address of the new memory access request, the memory addresses accessed by the memory access requests that are combined, where the offset address is a product of the acquired memory access granularity and i, and if a quantity of bits of the code bit vector of the new memory access request is N, a value of i ranges from 0 to N−1. Therefore, after the memory controller parses the new memory access request to acquire the base address, the code bit vector and the memory access granularity, a memory address mapped to the $i^{th}$ bit of the code bit vector, "base address+ granularity*i", can be computed. Finally, a memory access operation corresponding to the memory access request type of the new memory access request is executed on the accessed memory address that is obtained by the parsing.

In this embodiment of the present disclosure, when receiving the new memory access request, the memory controller can determine, according to the memory access request type of the new memory access request, whether to execute a read memory operation or a write memory operation. If the memory access request type of the new memory access request is a read memory operation, the memory controller executes a memory access operation, corresponding to the memory access request type of the new memory access request, on the accessed memory addresses that are obtained by the parsing, which includes reading data in the accessed memory addresses that are obtained by the parsing; returning the read data to the memory access processing apparatus, so that the memory access processing apparatus writes the returned data to a cache integrated on a processor chip; and updating a code bit identifier, which is in the code bit vector of an address index table and is corresponding to the memory access request whose data is returned, to a second code bit identifier that indicates there is no memory access operation. If the memory access request type of the new memory access request is a write memory operation, the memory controller executes a memory access operation, corresponding to the memory access request type of the new memory access request, on the accessed memory addresses that are obtained by the parsing, which includes acquiring data, sent by the memory access processing apparatus, corresponding to the write memory operation, and writing the data corresponding to the write memory operation to the accessed memory addresses that are obtained by the parsing.

In this embodiment, a memory controller executes, according to a received new memory access request, a memory access operation on a memory address that is in an off-chip memory and that is corresponding to a code bit for which a first code bit identifier is configured, thereby implementing processing on memory access requests combined by a memory access processing apparatus. During a memory access process, the memory controller implements a process of receiving and processing multiple memory access requests by receiving the memory access requests once, which effectively improves memory bandwidth utilization and ensures that a memory access request sent by a processor is processed in a timely manner.

A person of ordinary skill in the art can understand that all or a part of the steps of the method embodiments may be implemented by hardware relevant to program instructions. The program may be stored in a computer readable storage medium. When the program runs, a processor, such as a CPU, performs the steps of the foregoing method embodiments. The foregoing storage medium includes any medium that can store program code, such as a read-only memory (ROM), a random access memory (RAM), a magnetic disk, or an optical disc.

FIG. 5 is a schematic structural diagram of Embodiment 1 of a memory access processing apparatus according to the present disclosure. As shown in FIG. 5, the apparatus in this embodiment of the present disclosure includes a first acquiring unit 40 configured to receive a memory access request sent by a processor, a combining unit 41 configured to combine multiple memory access requests received within a preset time period to form a new memory access request, where the new memory access request includes a code bit vector consisting of code bits corresponding to memory addresses, a base address of the memory addresses accessed by the memory access requests that are combined, a memory access granularity, and a memory access request type, and a first code bit identifier indicating there is a memory access operation is configured for the code bits that are in the code bit vector and corresponding to the memory addresses accessed by the memory access requests that are combined, and a sending unit 42 configured to send the new memory access request to a memory controller, so that the memory controller executes, according to the new memory access request, a memory access operation on a memory address corresponding to the first code bit identifier.

The memory access processing apparatus in this embodiment of the present disclosure is disposed in a memory access path between the processor and the memory controller, and is configured to combine multiple memory access requests sent by the processor to form a new memory access request, and send the new memory access request to the memory controller in a unified manner, so as to reduce memory bandwidth utilization, and use the memory controller to access an off-chip memory. The first acquiring unit 40 receives the memory access requests sent by the processor. The combining unit 41 combines the multiple memory access requests received by the first acquiring unit 40 within the preset time period, and configures the corresponding first code bit identifier for the memory addresses accessed by the memory access requests, so that the memory controller can accurately obtain, by means of parsing, the accessed memory addresses. The sending unit 42 sends, to the memory controller, the new memory access request that is obtained by combination performed by the combining unit 41, so that the memory controller executes the memory access operation on the off-chip memory according to the new memory access request.

In this embodiment of the present disclosure, a combining unit combines multiple memory access requests received within a preset time period to form a new memory access request, so that multiple memory access requests with relatively low bandwidth utilization are combined into a corresponding new memory access request with high bandwidth utilization during a memory access process, so as to execute an access operation on a memory controller in a unified manner, which reduces a quantity of memory access requests that are sent to the memory controller, helps to improve memory bandwidth utilization, and further ensures that the memory controller performs timely processing on a memory access request sent by a processor. When the multiple memory access requests are combined to obtain the new memory access request, a corresponding first code bit identifier is configured for a memory address accessed by each combined memory access request, so that the memory controller can accurately execute a memory access operation on the corresponding memory address according to the first code bit identifier when performing memory access according to the new memory access request, thereby implementing effective data exchange between the processor and an off-chip memory. Therefore, in this embodiment of the present disclosure, timeliness of processing a memory access request sent by the processor is improved, and memory bandwidth utilization is further effectively improved during a memory access process.

Figure 6:
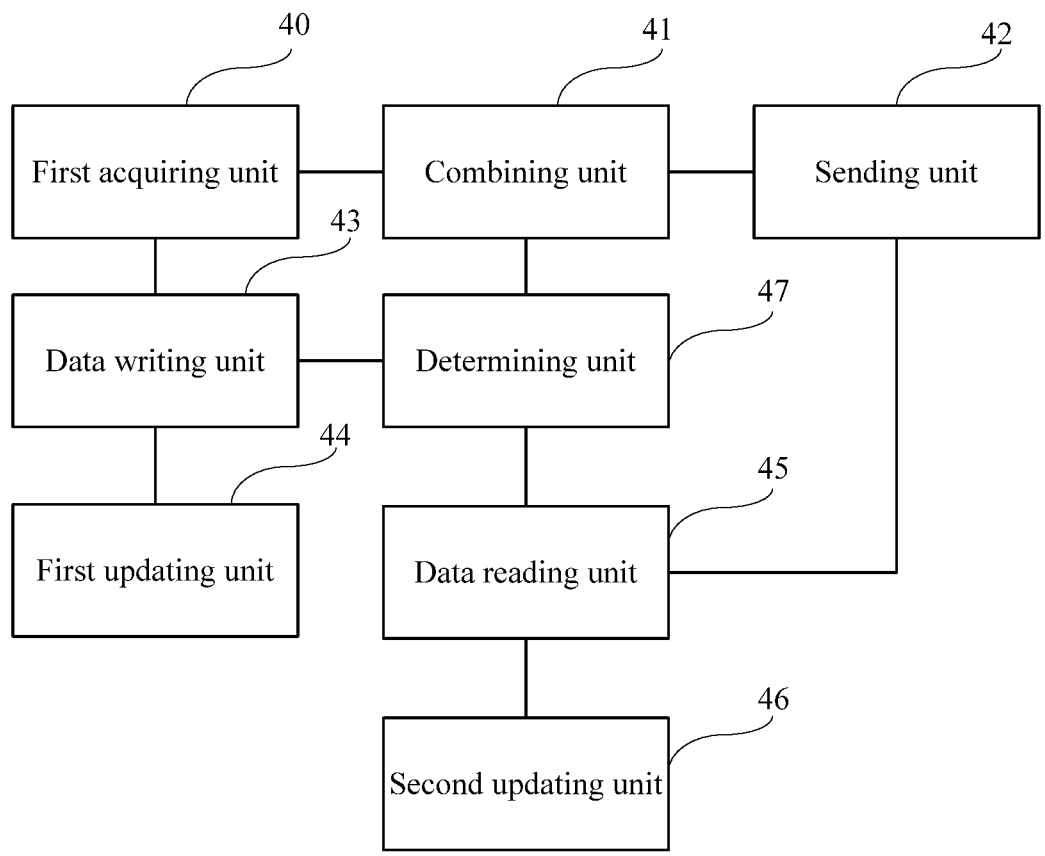
FIG. 6 is a schematic structural diagram of Embodiment 2 of a memory access processing apparatus according to the present disclosure.

FIG. 6 is a schematic structural diagram of Embodiment 2 of a memory access processing apparatus according to the present disclosure. As shown in FIG. 6, in this embodiment, a combining unit 41 is configured to collect, to a same row of an address index table, multiple memory access requests that are received within a preset time period and that have a same memory access request type, a same base address of memory addresses corresponding to the memory access requests, and a same memory access granularity, where each row of the address index table includes a memory access request type, a base address of memory addresses corresponding to memory access requests, a memory access granularity, and a code bit vector, and memory addresses corresponding to all code bits that form a code bit vector in each row have a same base address; and extract the memory access request type, the base address, the memory access granularity and the code bit vector of the collected memory access requests from the same row of the address index table to form a new memory access request. A determining unit 47 is configured to determine, according to the memory access request type in each row of the address index table, whether the new memory access request corresponding to the row is a read memory operation or a write memory operation. A data writing unit 43 is configured to, when the memory access request type of the new memory access request is a read memory operation, write data, which is returned after a memory controller executes the read memory operation according to the new memory access request, to a cache integrated in a processor. A first updating unit 44 is configured to update a first code bit identifier, which is in the code bit vector of the address index table and is corresponding to the executed memory access operation, to a second code bit identifier that indicates there is no memory access operation. A data reading unit 45 is configured to when the memory access request type of the new memory access request is a write memory operation, send data, which is corresponding to the write memory operation and is read from a cache of the processor, to the memory controller, so that the memory controller writes the data corresponding to the write memory operation to a memory address corresponding to the new memory access request. A second updating unit 46 is configured to update the first code bit identifier, which is in the code bit vector of the address index table and is corresponding to the executed memory access operation, to the second code bit identifier that indicates there is no memory access operation.

In this embodiment, the combining unit 41 collects, to a same row of the address index table, multiple memory access requests that are received within a period and that have a same memory access request type, a same base address of memory addresses corresponding to the memory access requests, and a same memory access granularity, and combines the multiple memory access requests into a new memory access request. The sending unit 42 sends, to the memory controller, the new memory access request that is acquired by combination. When the determining unit 47 determines that the corresponding new memory access request is read memory operation, that is, the memory access request sent by the processor indicates reading data from an off-chip memory into an on-chip cache, the memory controller interacts with the off-chip memory to execute the new memory access request, receives data returned by the off-chip memory, and returns the returned data to a first acquiring unit 40 of the memory access processing apparatus, so that the data writing unit 43 of the memory access processing apparatus writes the memory access request data acquired by the first acquiring unit 40 to a home node of data in the on-chip cache. During a data refilling process, data can be written to the cache progressively in many times, and the first updating unit 44 updates an identifier configured for a code bit in the code bit vector of the address index table, so as to record the memory access request whose data has been returned. When the determining unit 47 determines that the corresponding new memory access request is write memory operation, that is, the memory access request sent by the processor indicates writing data in an on-chip cache to an off-chip memory, the data reading unit 45 of the memory access processing apparatus reads the data from the on-chip cache. The sending unit 42 sends the read data to the memory controller; after receiving the new memory access request and the corresponding data. The memory controller generates a memory address of the off-chip memory according to the code bit vector and the base address, and writes the corresponding data to the generated memory address. During a data writing operation, the second updating unit 46 updates, in real time, a code bit identifier that is in the code bit vector and that is corresponding to the memory access request for which the write memory operation has been completed. During a process in which the memory access processing apparatus collects a memory access request to store it to the address index table, if a quantity of bits of a memory address is A, a quantity of bits of the code bit vector of the address index table is N, and a memory access granularity is L, the base address in a row of the collected memory access request with the memory access granularity L in the address index table has $(A-\log_2(N*L))$ bits. That is, after the quantity of bits of the memory address in a system is determined, a quantity of bits of the base address can be computed according to the quantity of bits of the code bit vector and the memory access granularity, and the first address of a memory address segment can be further determined. In this case, the received memory access request can be collected to the address index table corresponding to the base address and the memory access granularity. After the memory access processing apparatus combines the multiple memory access requests that have the same memory access request type, the same base address of the memory addresses corresponding to the memory access requests, and the same memory access granularity, the memory controller can accurately obtain, by means of parsing and according to the first code bit identifier configured for the code bit vector, the memory addresses accessed by the memory access requests that are combined, so as to execute a memory access operation.

In this embodiment, multiple memory access requests that have a same memory access request type, a same base address of memory addresses corresponding to the memory access requests, and a same memory access granularity, are combined, which enables a memory controller to process the memory access requests sent by a processor in a timely and accurate manner, helps to improve bandwidth utilization of the memory controller, and further makes a structure of a memory access processing apparatus simple and easy to implement.

Figure 7:
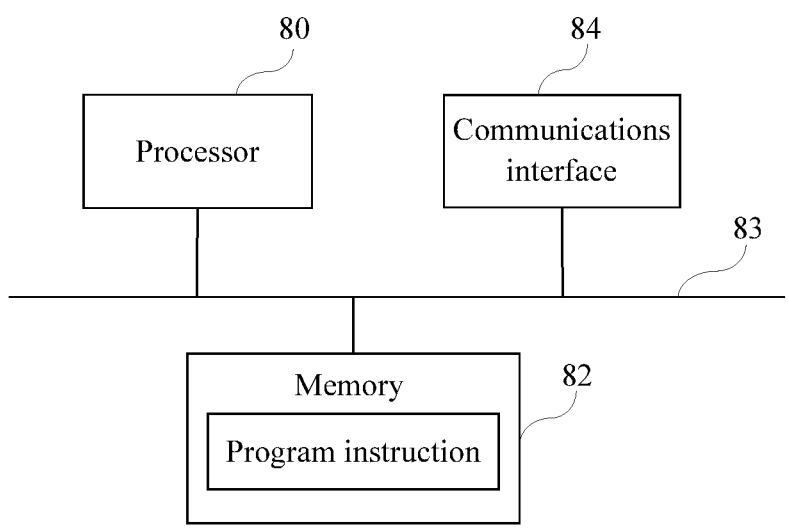
FIG. 7 is a schematic structural diagram of Embodiment 3 of a memory access processing apparatus according to the present disclosure.

FIG. 7 is a schematic structural diagram of Embodiment 3 of a memory access processing apparatus according to the present disclosure. As shown in FIG. 7, the memory access processing apparatus in this embodiment includes a processor 80, a memory 82, a communications interface 84, and a bus 83, where the processor 80, the communications interface 84 and the memory 82 communicate with each other using the bus 83. The memory 82 is configured to store a program instruction, for example, instruction code corresponding to operation steps of the memory access processing method in the foregoing embodiment. The processor 80 can be configured to execute the program instruction stored in the memory 82. The communications interface 84 can be configured to send or receive the program instruction between the processor and the memory or data that is generated according to the program instruction. The bus 83 is configured to implement communication between function units inside the memory access processing apparatus.

Figure 8:
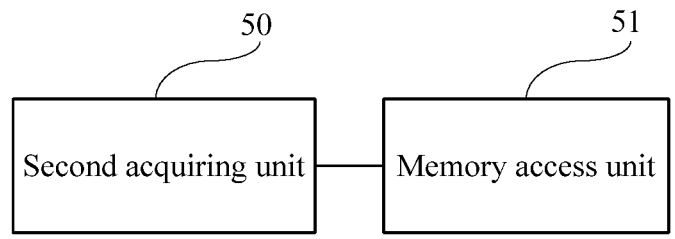
FIG. 8 is a schematic structural diagram of an embodiment of a memory controller according to the present disclosure.

FIG. 8 is a schematic structural diagram of an embodiment of a memory controller according to the present disclosure. As shown in FIG. 8, in this embodiment, the memory controller includes a second acquiring unit 50 configured to receive a new memory access request, where the new memory access request is formed by combining multiple memory access requests received within a preset time period, and the new memory access request includes a code bit vector consisting of code bits corresponding to memory addresses, a base address of the memory addresses accessed by the memory access requests that are combined, a memory access granularity and a memory access request type, and a first code bit identifier indicating there is a memory access operation is configured for the code bits that are in the code bit vector and corresponding to the memory addresses accessed by the memory access requests that are combined, and a memory access unit 51 configured to obtain, by parsing the new memory access request, the memory addresses accessed by the memory access requests that are combined, and execute a memory access operation on the memory addresses that are obtained by the parsing.

In this embodiment, after the second acquiring unit 50 of the memory controller receives the new memory access request that is formed by combination performed by a memory access processing apparatus, because the new memory access request is configured with the first code bit identifier corresponding to the memory addresses accessed by the memory access requests, the memory controller can obtain, by means of parsing, a to-be-accessed memory address according to the configured first code bit identifier, and execute a corresponding memory access operation according to the memory access granularity and the memory access request type of the new memory access request, so as to complete the memory access operation for a processor. By receiving one new memory access request in a unified manner, the memory controller can complete receiving processing on multiple memory access requests sent by the processor, thereby improving bandwidth utilization and reducing memory access latency.

To enable the memory controller to rapidly compute a memory address for a memory access operation and to implement a simple structure of the memory access processing apparatus, when the memory access processing apparatus combines the multiple memory access requests that are received within the preset time period and that have the same memory access request type, the same base address of the memory addresses corresponding to the memory access requests, and the same memory access granularity, to form the new memory access request, after the second acquiring unit 50 of the memory controller acquires the new memory access request sent by the memory access processing apparatus, the memory access unit 51 obtains, by means of parsing, the base address and the memory access granularity of the memory access requests that are combined in the new memory access request, and position information of each first code bit identifier in the code bit vector of the new memory access request. If the acquired position information indicates that the first code bit identifier is in the $i^{th}$ bit of the code bit vector, the memory access unit 51 obtains, by adding an offset address to the base address of the new memory access request, the memory addresses accessed by the memory access requests that are combined, where the offset address is a product of the acquired memory access granularity and i, and if a quantity of bits of the code bit vector of the new memory access request is N, a value of i ranges from 0 to N−1. The memory access unit 51 executes a memory access operation on the memory addresses accessed by the memory access requests that are combined that are obtained by the second acquiring unit 50.

If the memory access request type of the new memory access request is a read memory operation, the memory access unit is configured to read data in the accessed memory addresses that are obtained by the parsing, and return the read data to the memory access processing apparatus, so that the memory access apparatus writes the returned data to a cache integrated in the processor. If the memory access request type of the new memory access request is a write memory operation, the memory access unit is configured to acquire data that is corresponding to the write memory operation and sent by the memory access processing apparatus, and write the data corresponding to the write memory operation to the accessed memory addresses that are obtained by the parsing.

In this embodiment of the present disclosure, after a second acquiring unit of a memory controller acquires a new memory access request that is formed by combination performed by a memory access processing apparatus, a memory access unit acquires, by means of parsing and according to a first code bit identifier configured for a code bit vector of the new memory access request, memory addresses accessed by memory access requests that are combined, and executes a memory access operation on the memory addresses that are obtained by the parsing. In this way, instead of separately performing an access operation for many times on the memory controller for multiple memory access requests sent by a processor, one access operation is accurately executed on an off-chip memory for one new memory access request, thereby improving memory bandwidth utilization and reducing memory access latency.

An embodiment of the present disclosure further provides a memory access system, including at least one processor, an off-chip memory, the foregoing memory access processing apparatus shown in FIG. 5, FIG. 6 or FIG. 7, and the memory controller shown in FIG. 8. The memory access processing apparatus is configured to combine multiple memory access requests that are sent by the processor and received within a preset time period, to form a new memory access request, where the new memory access request includes a code bit vector consisting of code bits corresponding to memory addresses, a base address of the memory addresses accessed by the memory access requests that are combined, a memory access granularity, and a memory access request type. A first code bit identifier indicating there is a memory access operation is configured for the code bits that are in the code bit vector and corresponding to the memory addresses accessed by the memory access requests that are combined. The memory access processing apparatus is further configured to send the new memory access request to the memory controller. The memory controller is configured to receive the new memory access request, obtain, by parsing the new memory access request, the memory addresses accessed by the memory access requests that are combined, and execute a memory access operation on the memory addresses that are obtained by the parsing.

Figure 9:
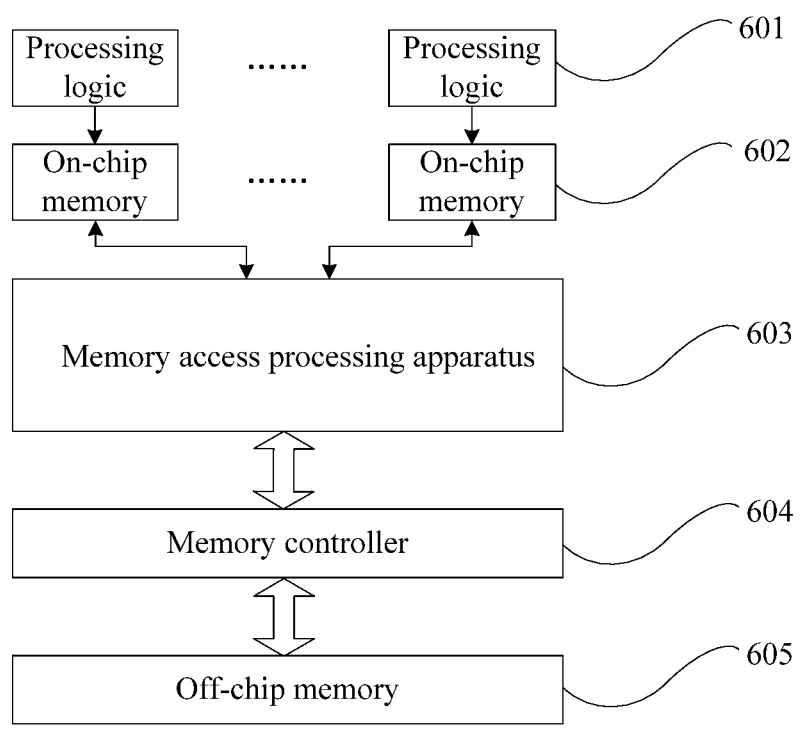
FIG. 9 is a schematic structural diagram of Embodiment 1 of a memory access system according to the present disclosure.

FIG. 9 is a schematic structural diagram of Embodiment 1 of a memory access system according to the present disclosure. As shown in FIG. 9, the system in this embodiment includes multiple processing logic 601, multiple on-chip memories 602, a memory access processing apparatus 603, a memory controller 604, and an off-chip memory 605, where the multiple processing logic 601 may be corresponding to multiple processor cores, the multiple on-chip memories 602 are on-chip caches, and the memory access processing apparatus 603 is configured to combine memory access requests of different granularities, which are sent by the processing logic 601 through the on-chip memories 602, to form a memory access request with a relatively large granularity. The process of combining memory access requests includes receiving a memory access request sent by a processor, combining multiple memory access requests received within a preset time period to form a new memory access request, where the new memory access request includes a code bit vector consisting of code bits corresponding to memory addresses, a base address of the memory addresses accessed by the memory access requests that are combined, a memory access granularity, and a memory access request type, and a first code bit identifier indicating there is a memory access operation is configured for the code bits that are in the code bit vector and corresponding to the memory addresses accessed by the memory access requests that are combined, and sending the new memory access request to the memory controller 604, so that the memory controller executes, according to the new memory access request, a memory access operation on a memory address that is in the off-chip memory 605 and that is corresponding to the first code bit identifier.

The memory access processing apparatus 603 can combine the multiple memory access requests and send the memory access requests to the memory controller in a unified manner, and then the memory controller performs the memory access operation on the off-chip memory, thereby improving memory bandwidth utilization effectively. The memory access processing apparatus 603 in this embodiment may be the foregoing apparatus shown in FIG. 5, FIG. 6 or FIG. 7.

Figure 10:
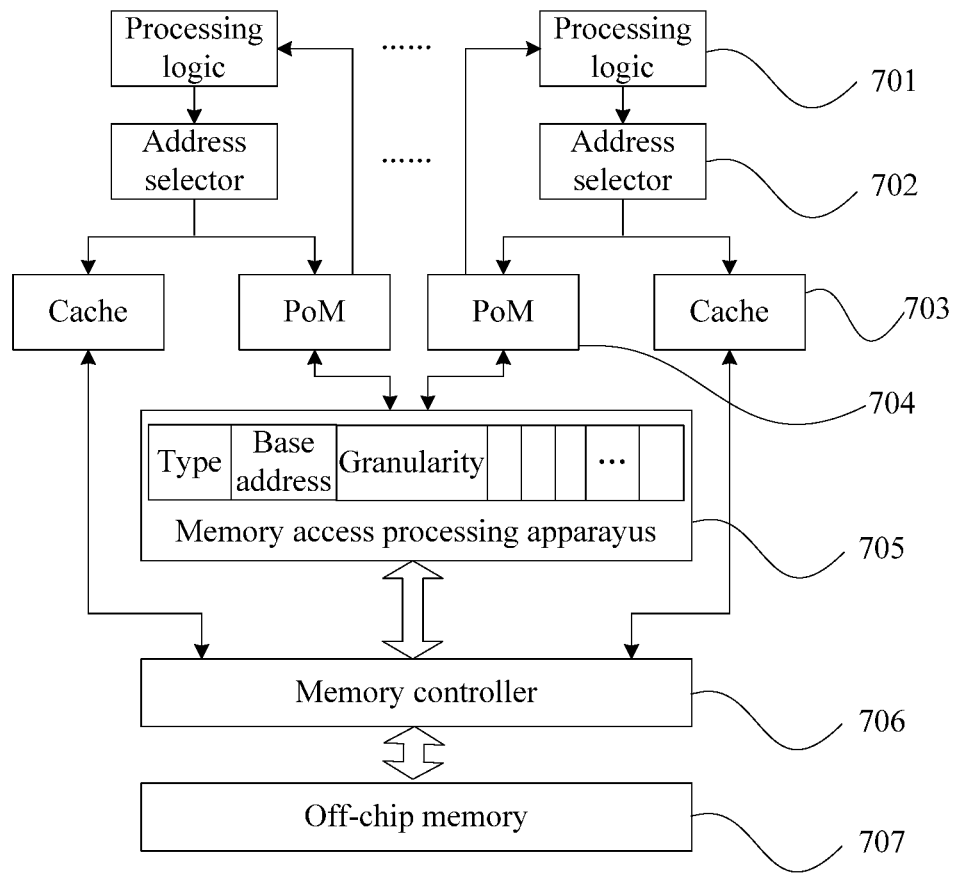
FIG. 10 is a schematic structural diagram of Embodiment 2 of a memory access system in actual application according to the present disclosure.

In actual application, the foregoing on-chip memory in FIG. 9 may include a PoM and a cache, and FIG. 10 is a schematic structural diagram of Embodiment 2 of a memory access system in actual application according to the present disclosure. As shown in FIG. 10, a processor chip in the system includes multiple address selectors 702 that are separately corresponding to multiple processing logic 701, where an address selector 702 is configured to determine, according to a memory access request sent by each processing logic 701, whether a memory access address for the memory access request is in a PoM address space. If the memory access address for the memory access request is in the PoM address space, send the memory access request to a PoM 704. Otherwise, send the memory access request to a cache 703. The memory access request sent to the PoM 704 is sent to an address index table in a memory access processing apparatus 705 through the PoM 704, and the memory access request is collected and combined in the address index table. If a memory access request type, a base address, and a granularity of the current memory access request are different from those in any existing row in the address index table, a new row is allocated in the address index table according to the memory access request type of the current memory access request, the base address corresponding to the memory address accessed by the current memory access request, and the memory access granularity, and a code bit in a code bit vector of the current memory access request is encoded. If the memory access request type, the base address and the memory access granularity of the current memory access request are the same as those in an existing row in the address index table, the current memory access request is combined into the row, and a code bit corresponding to the memory address of the current memory access request is encoded. When the address selector 702 determines that the memory address is not in the PoM address space, the address selector 702 sends the memory access request to the cache 703, and the cache 703 sends the memory access request to a memory controller 706 for executing a memory access operation.

In actual application, if the cache 703 is an on-chip cache in which a home node of data is set, that is, a management policy of the on-chip cache is modified partially to add a home node of data, the cache may also send the memory access request to the memory access processing apparatus for combination processing. Therefore, when the cache 703 receives the memory access request, if data of the request is in the cache, the data is directly returned to the processing logic 701. If data of the request is not in the cache, that is, cache data is not hit, the cache may send the memory access request that does not hit the data (cache miss request) to the memory access processing apparatus 705. The memory access processing apparatus 705 may combine memory access requests that do not hit the data and send the memory access requests to the memory controller in a unified manner. For a process of combination processing performed by the memory access processing apparatus on the memory access requests that do not hit the data, refer to the embodiment shown in FIG. 1 or FIG. 2, and details are not described herein again. If all the foregoing on-chip memories in the embodiment shown in FIG. 9 are caches, a manner in which the memory access processing apparatus performs, by setting a home node of the data, combination processing on the memory access requests that do not hit the cache data may also be used. The memory access processing apparatus 705 sends new memory access requests, formed by combination, in the address index table to the memory controller 706, so that the memory controller interacts with an off-chip memory 707 in a timely manner to implement a memory access operation.

The following example uses a system in which a 32-bit memory address is used, a read memory operation and a write memory operation with an 8-byte memory access granularity as an example for detailed description.

Figure 11:
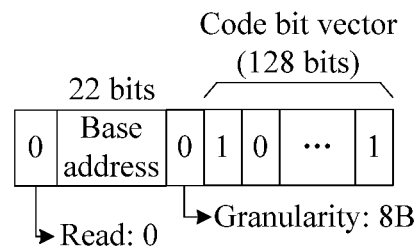
FIG. 11 is a schematic diagram for an embodiment of a result of combining read memory access requests in an address index table of a memory access processing apparatus.
Figure 12A:
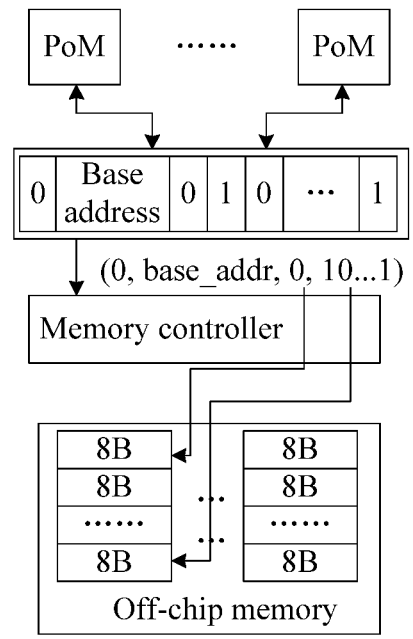
FIG. 12A is a schematic diagram of an embodiment of a memory access process of a new memory access request obtained by means of combining in FIG. 11.
Figure 12B:
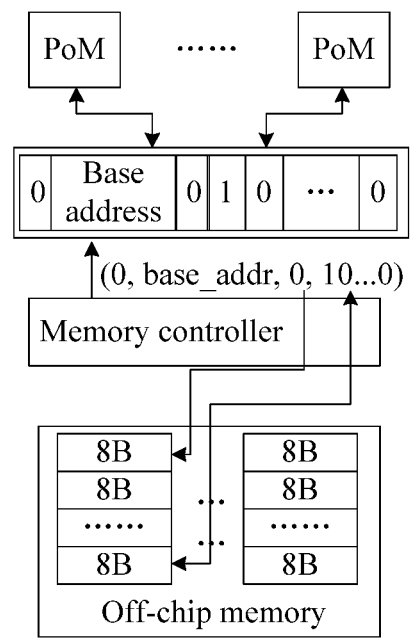
FIG. 12B is a schematic diagram of an embodiment of a data refilling process after memory access is performed for the new memory access request obtained by means of combining in FIG. 11.
Figure 12C:
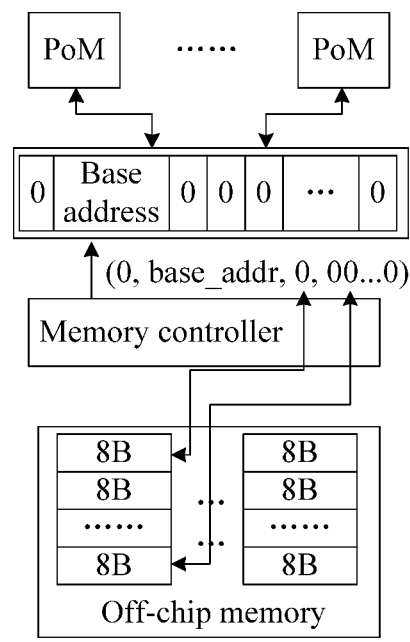
FIG. 12C is a schematic diagram of an embodiment of a data write-back completed state after the memory access is performed for the new memory access request obtained by means of combining in FIG. 11.

FIG. 11 is a schematic diagram for a result of combining read memory access requests in an address index table of a memory access processing apparatus. FIG. 12A is a schematic diagram of a memory access process of a new memory access request obtained by means of combining in FIG. 11. FIG. 12B is a schematic diagram of a data refilling process after memory access is performed for the new memory access request obtained by means of combining in FIG. 11. FIG. 12C is a schematic diagram of a data write-back completed state after the memory access is performed for the new memory access request obtained by means of combining in FIG. 11. As shown in FIG. 11, and FIG. 12A to FIG. 12C, it can be determined, according to an 8-byte granularity value and a 128-bit code bit vector, that a base address has 22 bits, and two read memory access requests with an 8-byte granularity are combined into the new memory access request, that is, a read memory operation is executed by the new memory access request on a memory address that is corresponding to a code bit whose identifier is 1 in the code bit vector in FIG. 11. Because the operation is a read memory operation, a memory controller can directly perform the read memory operation on an off-chip memory according to the new memory access request. The memory controller computes the memory address according to the code bit whose identifier is 1 and the base address of the new memory access request, and performs a read operation on the off-chip memory. After data of a memory address corresponding to a code bit is refilled to a PoM, the corresponding code bit is updated. After data is refilled to the address index table in FIG. 11, the address index table is in a state shown in FIG. 12B. When all code bits in a code bit vector in a row of the address index table are 0, it indicates that data refilling of all memory access requests that are combined in the row is complete. As shown in FIG. 12C, entry content in the row of the address index table may be deleted.

Figure 13:
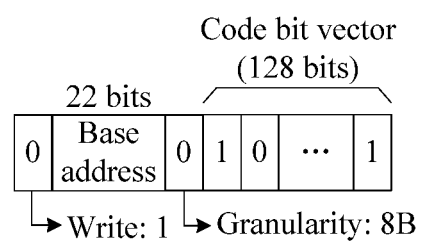
FIG. 13 is a schematic diagram for an embodiment of a result of combining write memory access requests in an address index table of a memory access processing apparatus.
Figure 14:
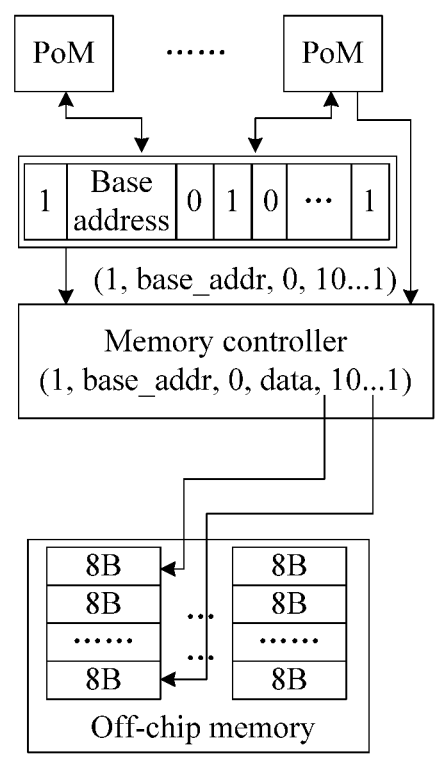
FIG. 14 is a schematic diagram of an embodiment of a memory access process of a new memory access request obtained by means of combining in FIG. 13.

FIG. 13 is a schematic diagram for a result of combining write memory access requests in an address index table of a memory access processing apparatus. FIG. 14 is a schematic diagram of a memory access process of a new memory access request obtained by means of combining in FIG. 13. As shown in FIG. 13 and FIG. 14, it may be determined, according to an 8-byte granularity value and a 128-bit code bit vector, that a base address has 22 bits, and two write memory access requests with a 8-byte granularity are combined into the new memory access request, that is, a write memory operation is executed by the new memory access request on a memory address that is corresponding to a code bit whose identifier is 1 in the code bit vector in FIG. 13. The memory access processing apparatus reads data of the memory address corresponding to the code bit from a PoM or a cache. Because the operation is a write memory operation, after the new memory access request is sent to a memory controller, the memory controller generates the memory address by means of computing according to the code bit in the code bit vector and the base address, and writes the data, which is read by the memory access processing apparatus, to the memory address of an off-chip memory generated by the memory controller. During the write memory operation, the memory access processing apparatus updates the code bit of the corresponding memory address on which the write operation has been completed by the memory controller, and the write memory operation is complete until all the code bits are 0 in the code bit vector. The memory access processing apparatus may delete entry content in a row, in which a code bit vector whose code bits are all 0 is located, of the address index table.

It should be noted that the foregoing embodiments are merely intended for describing the technical solutions of the present disclosure but not for limiting the present disclosure. Although the present disclosure is described in detail with reference to the exemplary embodiments, a person of ordinary skill in the art should understand that they may still make modifications or equivalent replacements to the technical solutions of the present disclosure without departing from the spirit and scope of the present disclosure.

What is claimed is:

1. A memory access request processing method implemented by a memory access processing apparatus, the method comprising:
   receiving a first memory access request and a second memory access request, wherein a length of a first memory address of the first memory access request and a second memory address of the second memory access request is A bits;
   combining the first memory access request and the second memory access request to form a third memory access request, wherein the third memory access request comprises a code bit vector comprising:
      N code bits comprising a first code bit corresponding to the first memory address and indicating the first memory access request and a second code bit corresponding to the second memory address and indicating the second memory access request,
      a memory access granularity of L bytes,
      a base address of the first memory address and the second memory address and comprising $(A-\log_2(N*L))$ bits, and
      a memory access request type; and
   sending the third memory access request to a memory controller.

2. The method according to claim 1, wherein the combining comprises:
   collecting, to a row of an address index table, the first memory access request and the second memory access request, wherein the row comprises the memory access request type, the base address, the memory access granularity, and the code bit vector; and extracting the memory access request type, the base address, the memory access granularity, and the code bit vector from the row to form the third memory access request.

3. The method according to claim 1, wherein when the memory access request type is a read memory operation, after the sending, the method further comprises:
writing data returned after the memory controller executes the read memory operation according to the third memory access request to a cache integrated in the processor; and
updating the first code bit identifier.

4. The method according to claim 1, wherein when the memory access request type is a write memory operation, after sending the third memory access request to a memory controller, the method further comprises:
sending data corresponding to the write memory operation and read from a cache of the processor to the memory controller; and
updating the first code bit identifier.

5. The method according to claim 1, further comprising:
determining, by a processing logic, that the first memory address is in a programmable on-chip memory (POM) address space;
sending, by the processing logic, the first memory access request to an address selector; and
sending, by the address selector, the first memory access request to the POM.

6. A memory access processing apparatus comprising:
a processor; and
a memory coupled to the processor and comprising a plurality of instructions, that when executed by the processor, cause the processor to:
receive a first memory access request and a second memory access request, wherein a length of a first memory address of the first memory access request and a second memory address of the second memory access request is A bits;
combine the first memory access request and the second memory access request to form a third memory, access request, wherein the third memory access request comprises a code bit vector comprising:
N code bits comprising a first code bit corresponding to the first memory address and indicating the first memory access request and a second code bit corresponding to the second memory address and indicating the second memory access request,
a memory access granularity of L bytes,
a base address of the first memory address and the second memory address and comprising ($A-\log_2 (N*L)$) bits, and
a memory access request type; and
send the third memory access request to a memory controller.

7. The apparatus according to claim 6, wherein the instructions further cause the processor to:
collect, to a row of an address index table, the first memory access request and the second memory access request, wherein the row comprises the memory access request type, the base address, the memory access granularity, and the code bit vector; and
extract the memory access request type, the base address, the memory access granularity, and the code bit vector from the row to form the third memory access request.

8. The apparatus according to claim 6, wherein when the memory access request type is a read memory operation, the instructions further cause the processor of the apparatus to:
write data returned after the memory controller executes the read memory operation according to the third memory access request to a cache integrated in the processor; and
update the first code bit identifier.

9. The apparatus according to claim 6, wherein when the memory access request type is a write memory operation, the instructions further cause the processor of the apparatus to:
send data corresponding to the write memory operation and read from a cache of the processor to the memory controller; and
update the first code bit identifier.

10. A memory access system comprising:
a processor;
an off-chip memory coupled to the processor;
a memory controller; and
a memory access processing apparatus coupled to the processor and the memory controller and configured to:
receive a first memory access request and a second memory access request that are sent by the processor, wherein a length of a first memory address of the first memory access request and a second memory address of the second memory access request is A bits:
combine the first memory access request and the second memory access request to form a third memory access request, wherein the third memory access request comprises a code bit vector comprising:
N code bits comprising a first code bit corresponding to the first memory access request and a second code bit corresponding to the second memory access request,
a memory access granularity of L bytes,
a base address of the first memory address and the second memory address and comprising ($A-\log_2 (N*L)$) bits, and
a memory access request type; and
send the third memory access request to the memory controller,
wherein the memory controller is configured to:
receive the third memory access request;
obtain, by parsing the third memory access request, the first memory address and the second memory address; and
execute a memory access operation on the first memory address and the second memory address.

11. The system according to claim 10, wherein the memory access processing apparatus is further configured to:
collect, to a row of an address index table, the first memory access request and the second memory access request, wherein the row comprises the memory access request type, the base address, the memory access granularity, and the code bit vector; and
extract the memory access request type, the base address, the memory access granularity, and the code bit vector from the row to form the third memory access request.

12. The system according to claim 10, wherein when the memory access request type is a read memory operation, the memory controller is further configured to:
parse the third memory access request to obtain the first memory address;
read data stored in the first memory address, and return the data to the memory access processing apparatus, and wherein the memory access processing apparatus is further configured to:
  write the data to a cache integrated in the processor; and
  update the first code bit identifier.

13. The system according to claim 10, wherein when the memory access request type of the third memory access request is a write memory operation, the memory access processing apparatus is further configured to:
  send data corresponding to the write memory operation and read from a cache of the processor to the memory controller; and
  update the first code bit identifier, and
  wherein the memory controller is further configured to:
    parse the third memory access request to obtain the first memory address; and
    write the data to the first memory address.

14. The system according to claim 10, further comprising:
  a programmable on-chip memory (POM);
  a processing logic configured to
    determine that the first memory address is in an address space of the POM; and
    send the first memory access request to the address selector; and
  an address selector configured to send the first memory access request to the POM.

* * * * *